United States Patent
Ji et al.

(10) Patent No.: US 11,460,253 B2
(45) Date of Patent: Oct. 4, 2022

(54) METHOD FOR DESIGNING STARTUP CRITICAL TUBE DIAMETER OF PULSATING HEAT PIPE IN VERTICAL STATE

(71) Applicant: Dalian Maritime University, Liaoning (CN)

(72) Inventors: Yulong Ji, Liaoning (CN); Lilin Chu, Liaoning (CN); Yantao Li, Liaoning (CN); Xiu Xiao, Liaoning (CN); Chunrong Yu, Liaoning (CN)

(73) Assignee: DALIAN MARITIME UNIVERSITY, Liaoning (CN)

( * ) Notice: Subject to any disclaimer, the term of this patent is extended or adjusted under 35 U.S.C. 154(b) by 120 days.

(21) Appl. No.: 16/998,826

(22) Filed: Aug. 20, 2020

(65) Prior Publication Data
US 2021/0055058 A1    Feb. 25, 2021

(30) Foreign Application Priority Data

Aug. 20, 2019    (CN) .......................... 201910770505.9

(51) Int. Cl.
*F28D 15/02*    (2006.01)
*B23P 15/26*    (2006.01)

(52) U.S. Cl.
CPC .......... *F28D 15/0266* (2013.01); *B23P 15/26* (2013.01); *F28D 15/0233* (2013.01); *B23P 2700/09* (2013.01)

(58) Field of Classification Search
CPC ............. F28D 15/0266; F28D 15/0233; F28D 15/0275; B23P 15/26; B23P 2700/09; H01L 23/427
See application file for complete search history.

(56) References Cited

U.S. PATENT DOCUMENTS

| | | | |
|---|---|---|---|
| 2006/0137862 A1* | 6/2006 | Huang ................... | H01L 23/427 165/104.33 |
| 2009/0008066 A1* | 1/2009 | Meng .................... | F28F 13/003 415/177 |

(Continued)

*Primary Examiner* — Lee A Holly
(74) *Attorney, Agent, or Firm* — Novick, Kim & Lee, PLLC; Allen Xue

(57) ABSTRACT

A method for designing startup critical tube diameter of pulsating heat pipe in vertical state, including the following steps: step 1. establishing a first model of working medium mass in pulsating heat pipe; step 2. establishing a second model of working medium mass in pulsating heat pipe, the second model including the vapor working medium mass model and the liquid working medium mass model in the pulsating heat pipe; step 3. according to the law of conservation of mass, combining the first model and the second model, and determining the volume percentage of the liquid working medium in the total length of the pulsating heat pipe under the condition of heat addition; step 4. determining the startup critical tube diameter of the pulsating heat pipe according to the volume percentage of the liquid working medium in the total length of the pulsating heat pipe under the condition of heat addition obtained in step 3, the physical properties of the working medium in the pulsating heat pipe, the temperatures at the heat-absorbing end and heat-releasing end, the heating power, and the filling factor.

5 Claims, 9 Drawing Sheets

(56) References Cited

U.S. PATENT DOCUMENTS

| | | | | |
|---|---|---|---|---|
| 2016/0090658 A1* | 3/2016 | Diver | ............... | C25C 3/04 |
| | | | | 165/104.21 |
| 2018/0338392 A1* | 11/2018 | Fuller | ............... | H05K 7/20318 |
| 2020/0088479 A1* | 3/2020 | Tseng | ............... | F28D 15/0275 |
| 2020/0400380 A1* | 12/2020 | Ma | ............... | F28D 15/02 |

* cited by examiner (a)

(b)

(c)

(d)

(e)

(f)

(c)

(d)

(e)

(f)

METHOD FOR DESIGNING STARTUP CRITICAL TUBE DIAMETER OF PULSATING HEAT PIPE IN VERTICAL STATE

TECHNICAL FIELD

The present disclosure relates to the technical field of efficient heat-sink cooling of micro-electronics and semi-conductor components, in particular to a method for designing startup critical tube diameter of a pulsating heat pipe in vertical state, which design the startup critical tube diameter of pulsating heat pipe based on vertical state.

BACKGROUND ART

Pulsating heat pipe is a new-type and efficient heat transfer element which can be used in small space with high heat flux. A pulsating heat pipe is generally composed of many curved capillary tubes, which are filled with working fluid under vacuum to form vapor-liquid interval state under the action of surface tension and flow resistance. The adding heat of the pulsating heat pipe is transferred to the working fluid in the evaporation section, and the working fluid absorbs heat at the heat-absorbing end to generate bubbles at an evaporation temperature lower than the temperature at normal pressure, rapidly expands and boosts pressure to maintain the movement of the working fluid in the pulsating heat pipe. In addition to the phase change heat transfer of the working fluid, the oscillation of the working fluid of the pulsating heat pipe in the evaporation section and the condensation section can cause forced convection in the pipe, which greatly improves the heat transfer performance of the pulsating heat pipe. With the increase of the input power in the evaporation section, the movement of the working fluid in the pulsating heat pipe becomes more intense, the internal convection heat transfer capacity is further enhanced, and the heat transfer capacity of the pulsating heat pipe is also significantly improved. Therefore, the pulsating heat pipe is considered as one of the most effective technologies to solve heat transfer with high heat flux density.

In the prior art, the maximum pipe diameter of a pulsating heat pipe which can ensure the liquid slug suspended in the vapor plug at the operating temperature is defined the maximum hydraulic diameter, and the pulsating heat pipe cannot work when the pipe diameter of the pulsating heat pipe exceeds the maximum hydraulic diameter. Therefore, the existing method for designing the maximum hydraulic diameter limits the development of the pulsating heat pipe towards the direction of large pipe diameter. With further research of the pulsating heat pipe technology, according to the visualization experiment results of the pulsating heat pipe, the pulsating heat pipe can work as long as the vapor plug can be formed after heating. The supercritical tube diameter pulsating heat pipe is defined as a pulsating heat pipe that can still work when its hydraulic diameter exceeds the maximum hydraulic diameter. The maximum hydraulic diameter that can make the supercritical hydraulic diameter pulsating heat pipe work is called the startup critical tube diameter.

Therefore, it is necessary to provide a kind of supercritical tube diameter pulsating heat pipe which can realize better heat transfer performance and a method for designing the startup critical tube diameter, so as to overcome the limits of the prior art and make the pulsating pipe work better in a reasonable pipe diameter range.

SUMMARY OF THE INVENTION

According to the above technical problem that the pulsating heat pipe diameter cannot work due to the limitation of the maximum hydraulic diameter in the prior art, the present disclosure provides a method for designing startup critical tube diameter of a pulsating heat pipe in vertical state. The present disclosure is mainly through the establishments of a first model and a second model of the working medium mass in the pulsating heat pipe, according to the law of conservation of mass before and after heat addition, to combine the first model and the second model, and use the physical properties of the working medium, the temperatures at the heat-absorbing end and the heat-releasing end, the heating power, and the filling ratio, so as to determine the startup critical tube diameter of the pulsating heat pipe.

The present disclosure provides the following technical solution:

A method for designing startup critical tube diameter of pulsating heat pipe in vertical state, including the following steps:

step 1. establishing a first mass model of working medium in pulsating heat pipe; the first model is obtained by a set of preset parameters of the pulsating heat pipe without heat addition, the set of preset parameters including an effective length of the pulsating heat pipe, a channel cross-sectional area, a density of the liquid working medium at an operating temperature, and a filling ratio;

step 2. establishing a second mass model of working medium in pulsating heat pipe; the second model includes vapor working medium mass model and liquid working medium mass model in the pulsating heat pipe; the vapor working medium mass model in the pulsating heat pipe is obtained by a set of parameters of vapor working medium under the condition of adding heat, the set of parameters of vapor working medium including an average density of the vapor working medium a volume percentage of the vapor working medium in total length of the pulsating heat pipe, an effective length of the pulsating heat pipe, and a channel cross-sectional area; the liquid working medium mass model in the pulsating heat pipe is obtained by a set of parameters of liquid working medium under the condition of adding heat, the set of parameters of liquid working medium including an average density of liquid working medium, a volume percentage of the liquid working medium in the total length of the pulsating heat pipe, an effective length of the pulsating heat pipe, and a channel cross-sectional area;

step 3. according to the law of conservation of mass before and after heat addition, combining the first model and the second model, and determining a volume percentage of the liquid working medium in the total length of the pulsating heat pipe under the condition of adding heat; and step 4. determining a startup critical tube diameter of the pulsating heat pipe according to the volume percentage of the liquid working medium in the total length of the pulsating heat pipe under the condition of adding heat obtained in step 3, the physical properties of the working medium in the pulsating heat pipe, the temperatures at the heat-absorbing end and the heat-releasing end, the heating power, and the filling ratio.

Further, the first model satisfies the following equation:

$$M = \Phi L A \rho_{L,0};$$

wherein, M represents the mass of the working medium in the pulsating heat pipe without heat addition, with the unit of kg; L represents the effective length of the pulsating heat pipe, with the unit of m; A represents the channel cross-sectional area, with the unit of m$^2$; $\rho_{L,0}$ represents the density of the liquid working medium at the operating temperature before heat addition, with the unit of kg/m$^3$; $\Phi$ represents the filling ratio, with the unit of %.

Further, the second model satisfies the following equation:

$$M_{L,1} = \varphi A L \rho_{L,av};$$

$$M_{G,1} = (1-\varphi) A L \rho_{G,av};$$

wherein, $M_{L,1}$ represents the mass of liquid working medium in a single pipe after heat addition, with the unit of kg; $M_{G,1}$ represents the mass of vapor working medium in a single pipe after heat addition, with the unit of kg; $\rho_{L,av}$ represents the average density of the liquid working medium after heat addition, with the unit of kg/m$^3$; $\rho_{G,av}$ represents the average density of vapor working medium after heat addition, with the unit of kg/m$^3$; $\varphi$ represents the volume percentage of the liquid working medium in the total length of the pulsating heat pipe under the condition of adding heat, with the unit of %.

Further, the volume percentage of the liquid working medium in the total length of the pulsating heat pipe under the condition of adding heat satisfies the following equation:

$$M = M_{G,1} + M_{L,1};$$

$$\varphi = \frac{\Phi \rho_{L,0} - \rho_{G,av}}{\rho_{L,av} - \rho_{G,av}};$$

wherein, $\varphi$ represents the volume percentage of the liquid working medium in the total length of the pulsating heat pipe under the condition of adding heat, with the unit of %.

Further, the startup critical tube diameter of the pulsating heat pipe satisfies the following equation:

$$D = \left\{ \frac{4 p_g q}{u \pi h_c \left[ \frac{\Phi}{\varphi} \rho_{L,0} - \rho_{L,av} \right]} \right\}^{\frac{1}{2}}; \text{wherein,}$$

$$A = \frac{1}{4} \pi D^2;$$

$$u = 1.53 \left[ \frac{g(\rho_{L,av} - \rho_{G,av}) \sigma_{av}}{\rho_{L,av}^2} \right]^{\frac{1}{4}};$$

$$q = \frac{Q}{t};$$

$$t = \frac{\varphi L}{u};$$

$$p_g = \frac{\dot{m}_G h_c t}{Q};$$

$$\dot{m}_G t = M_{G,1} = M - M_{L,1} = M - LA\varphi\rho_{L,av};$$

wherein, D represents the startup critical tube diameter of the pulsating heat pipe; u represents a rising velocity of the bubble relative to the liquid, with the unit of m/s, which is the terminal velocity of the bubble, and the velocity of the bubble relative to the liquid is constant at u; $\sigma_{av}$ represents surface tension of the working medium, with the unit of N/m; g is the acceleration of gravity, with the unit of N/kg; t represents the time for the bubble moving from the heat-absorbing end to the heat-releasing end ignoring the influence of a single bubble on the liquid level height; Q represents the heat input in the time t, with the unit of J; q represents the input power, with the unit of J/s; $\dot{m}_G$ represents a mass flow rate of vapor working medium, with the unit of kg/s; $h_c$ represents the latent heat of vaporization of the working medium at cold end temperature, with the unit of J/kg; and $p_g$ represents a proportion of the latent heat, with the unit of %.

Further, the working medium in each pipe of the pulsating heat pipe is uniformly distributed with the same liquid level height, ignoring the influence of the turn on the liquid level height; after heat addition, the working medium in the pulsating heat pipe is a vapor-liquid mixture state. When the liquid level of the vapor-liquid mixture working medium reaches the effective length L under the working condition, the pulsating heat pipe is in a normal working state.

Further, in step 1, when the working medium is filled into the pulsating heat pipe, the mass of the working medium will change due to the working medium evaporation causing by environmental factors. Since no heat is added at this time, the mass of the vapor is far less than the mass of the liquid, which can be ignored. Therefore, the errors caused by environmental factors are ignored.

The present disclosure also provides a supercritical tube diameter pulsating heat pipe, which is obtained by the method for designing startup critical tube diameter of pulsating heat pipe in vertical state.

Further, a volume filling ratio $\Phi$ of the working medium in the pulsating heat pipe is greater than or equal to 10% and less than or equal to 90%.

Further, the working medium is in a vapor-liquid two-phase state after being filled into the pulsating heat pipe, and the working medium is a single working medium or a mixed working medium.

Further, the single working medium is a liquid metal or a liquid nonmetal.

Further, the mixed working medium is a mixture of liquid metal and liquid nonmetal, or a mixture of liquid metal and liquid metal.

Compared with the prior art, the present disclosure has the following advantages:

1. The present disclosure provides a method for designing startup critical tube diameter of pulsating heat pipe in vertical state, the obtained tube diameter of the pulsating heat pipe is greater than that obtained by the method for designing the maximum hydraulic diameter in the prior art, and the tube diameter of the pulsating heat pipe is between the maximum hydraulic diameter and the startup critical tube diameter, which can efficiently work, has better heat transfer performance, and higher heat transfer limitation.

2. The method for designing startup critical tube diameter of pulsating heat pipe in vertical state provided in the present disclosure fully considers the filling ratio of the working medium, the volume percentage of the liquid working medium in the total length after heat addition, the density of the liquid working medium at the operating temperature before heat addition, the average density of the liquid working medium after heat addition, the rising velocity of the bubble relative to the liquid, the latent heat of vaporization of the working medium at cold end temperature, the input power, and the proportion of latent heat, which further expands the research scope of the pulsating heat pipe.

3. The method for designing startup critical tube diameter of pulsating heat pipe in vertical state provided in the present disclosure provides a design reference for the application of the pulsating heat pipe in industry; especially under the working condition of high heat flux density, the cheaper working medium and thicker pipe diameter can be used to reduce the cost.

The technical solution in the present disclosure solves the problem existed in the prior art that the pulsating heat pipe cannot work when the tube diameter of the pulsating heat pipe exceeds the maximum hydraulic diameter.

The present disclosure can be widely popularized in aviation, military industry and other fields where pulsating heat pipe is used for heat transfer.

BRIEF DESCRIPTION OF THE DRAWINGS

In order to illustrate more clearly the embodiments of the present disclosure or the technical solutions in the prior art, the drawings required in the description of the embodiments will be briefly introduced blow. Obviously, the drawings in the following descriptions are some embodiments of the present disclosure. For those of ordinary person skilled in the art, other drawings can be obtained based on these drawings without inventive effort.

DETAILED DESCRIPTION OF THE PREFERRED EMBODIMENTS

In order to make those of ordinary person skilled in the art better understand the technical solutions of the present disclosure, a clear and complete description in the embodiments of the present disclosure may be given herein after in combination with the accompany drawings in the embodiments of the present disclosure. Obviously, the described embodiments are parts of the present disclosure, but not all of them. Based on the embodiments in the present disclosure, all other embodiments obtained by those of ordinary person skilled in the art without inventive effort are within the protection scope of the present disclosure.

The technical terms used in following embodiments are described below:

The equation of startup critical tube diameter: refers to the calculation equation of startup critical tube diameter of pulsating heat pipe obtained according to the method for designing startup critical tube diameter of pulsating heat pipe in vertical state in the present disclosure;

$$D = \left\{ \frac{4 p_g q}{u \pi h_c \left[ \frac{\Phi}{\varphi} \rho_{L,0} - \rho_{L,av} \right]} \right\}^{\frac{1}{2}};$$

For the induction process of the equation and the definition of each parameter in the equation, please refer to the summary of the invention, which will not be repeated here.

The calculation equation of maximum hydraulic diameter: refers to the maximum diameter of the liquid slug formed automatically by the working medium in the pipe depending on its own surface tension without external input power in the pulsating heat pipe. Its definition equation is as follows:

$$D_{cl} = 2 \sqrt{\frac{\sigma_0 Bo}{g(\rho_{l,0} - \rho_{v,0})}}$$

wherein, $D_{cl}$ represents the maximum hydraulic diameter, Bo is the Bond number, generally set at 0.85, g is the acceleration of gravity, $\rho_{l,0}$ and $\rho_{v,0}$ respectively represent the densities of liquid and vapor phases at operating temperature, and $\sigma_0$ represents the surface tension at operating temperature.

In the following embodiments, those of person skilled in the art can directly calculate the startup critical tube diameter and the maximum hydraulic diameter under the corresponding conditions according to the given operating temperature, working medium, and the above calculation equations of startup critical tube diameter and maximum hydraulics diameter.

Embodiment 1

Figure 1:
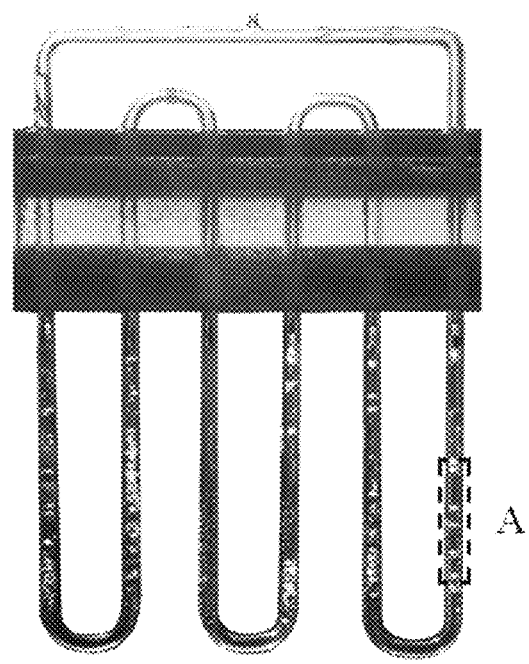
FIG. 1 is a schematic diagram of the forming process of the vapor plug in a pulsating heat pipe in the visualization experiment of the present disclosure.
Figure 2:
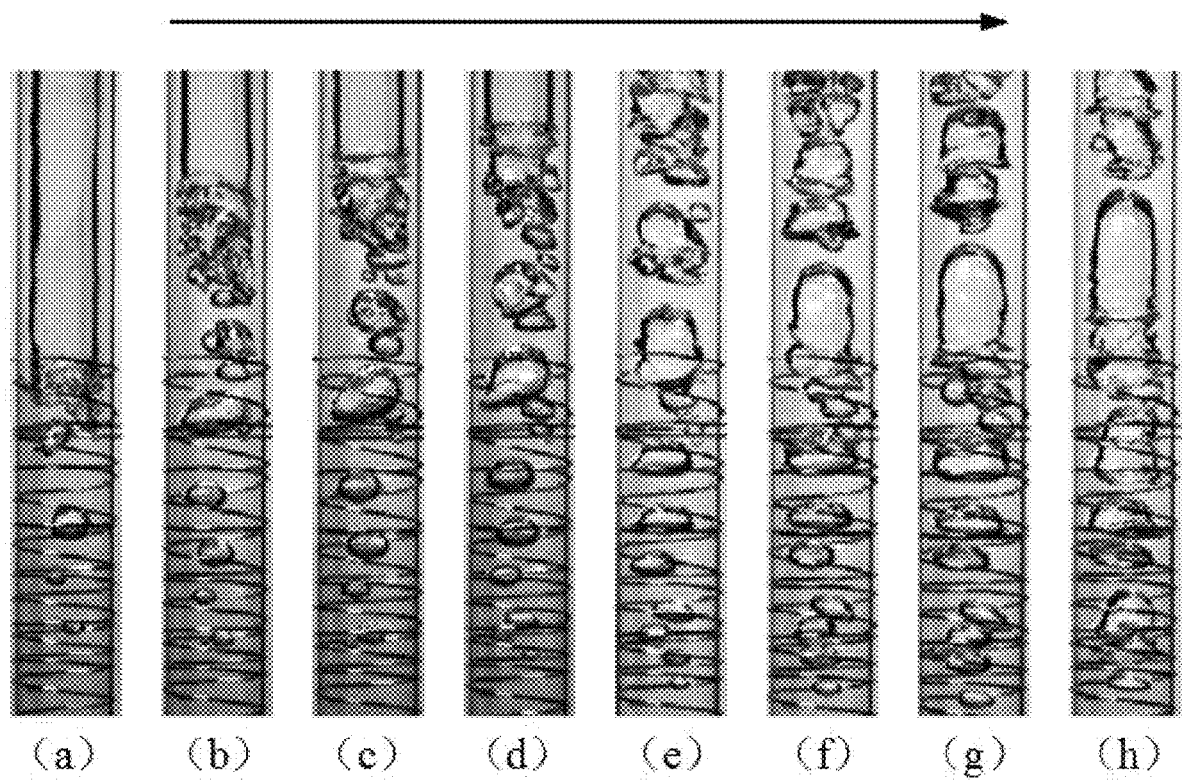
FIG. 2 is a schematic diagram of part A in FIG. 1, wherein (a) and (b) are the generating process of small bubbles, and (c), (d), (e) and (f) are the process of small bubbles coalesce and grow into large bubbles, (g) and (h) are the process of large bubbles continuously coalesce and grow into long columnar bubbles.

FIG. 1 and FIG. 2 are schematic diagrams of the forming process of the vapor plug in the visualization experiment of the supercritical tube diameter pulsating heat pipe. The reason for the operation of the supercritical tube diameter pulsating heat pipe is the formation of the vapor plug. According to the experimental results, when the pipe diameter of the pulsating heat pipe exceeds the maximum hydraulic diameter, the vapor plug is formed in the working process, which includes the following processes: (1) generation of small bubbles, as shown in pictures (a) and (b) in FIG. 2; (2) small bubbles coalesce and grow into large bubbles (the diameter of the bubble is smaller than the pipe diameter), as shown pictures (c), (d), (e) and (f) in FIG. 2; (3) large bubbles continuously coalesce and growth into long columnar bubbles (forming vapor plug), as shown in pictures (g) and (h) in FIG. 2.

Figure 3:
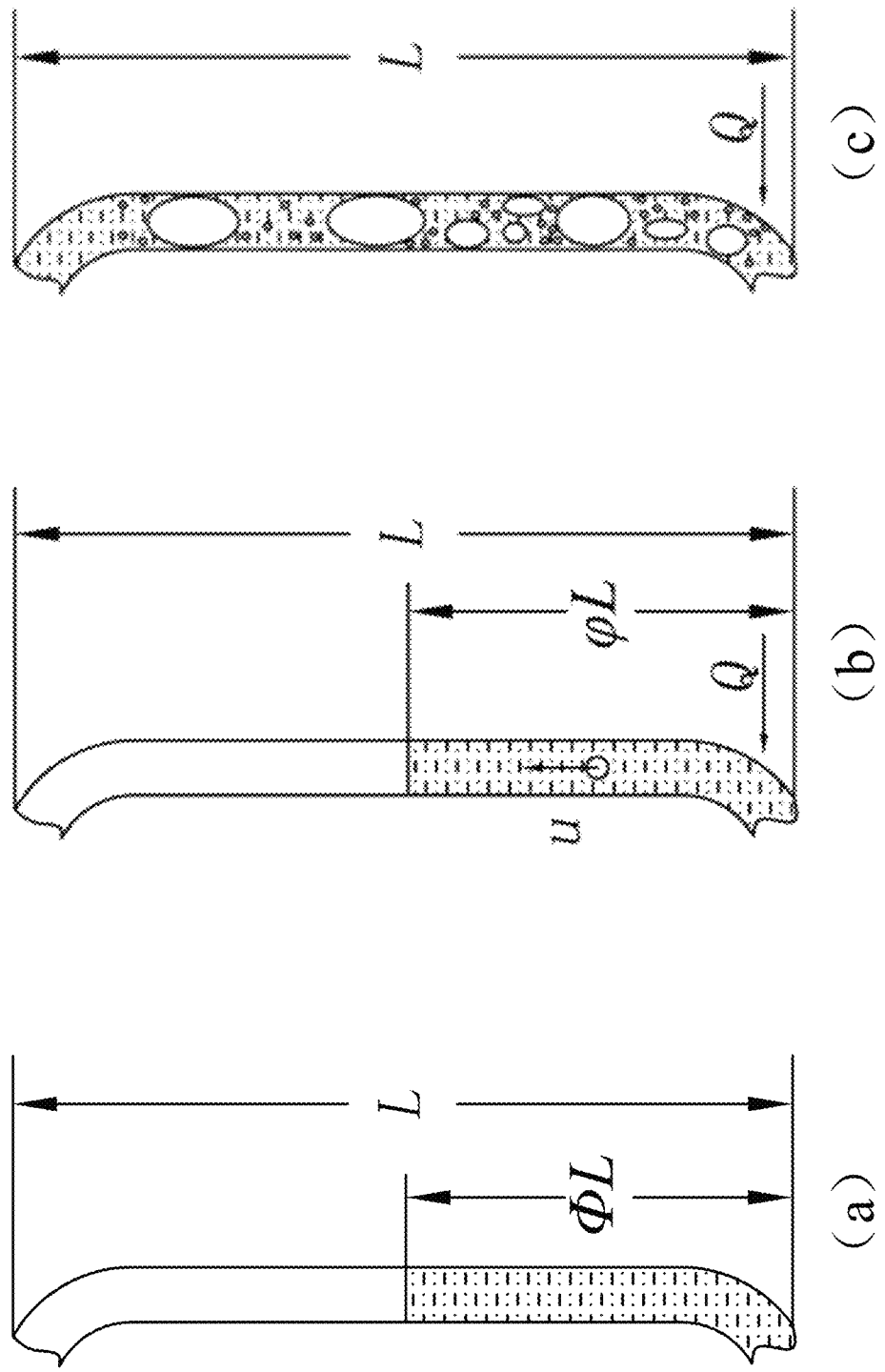
FIG. 3 is a schematic diagram of the pulsating heat pipe at different states of the present disclosure, wherein (a) shows a distribution of working fluid before heating, (b) shows a bubble formed in the liquid after heating, and (c) shows the working condition that reaches the working state.

FIG. 3 is a schematic diagram of the pulsating heat pipe at different states. Before heat addition, ignoring the vapor mass produced by vaporization after the working medium is charged, and the charged working medium in each pipe of the pulsating heat pipe is evenly distributed with a same liquid level height ΦL, ignoring the influence of the turn on the liquid level height, as shown in picture (a) in FIG. 3; after heat addition, the working medium in the pulsating heat pipe is in a vapor-liquid mixed state, the liquid level height of the working medium is φL in this condition and increases gradually, as shown in picture (b) in FIG. 3; when the liquid level of the vapor-liquid mixed working medium after heat addition reaches the effective length L, the pulsating heat pipe is in a normal working state, as shown in picture (c) in FIG. 3.

Embodiment 2

The working condition of this embodiment was that the input power of a single pipe was 30 W, the operating temperature was 20° C., the working medium was anhydrous ethanol, the filling ratio was 30%, and the temperature at the heat-absorbing end was respectively 30° C., 50° C., 70° C. and 90° C.

Figure 4:
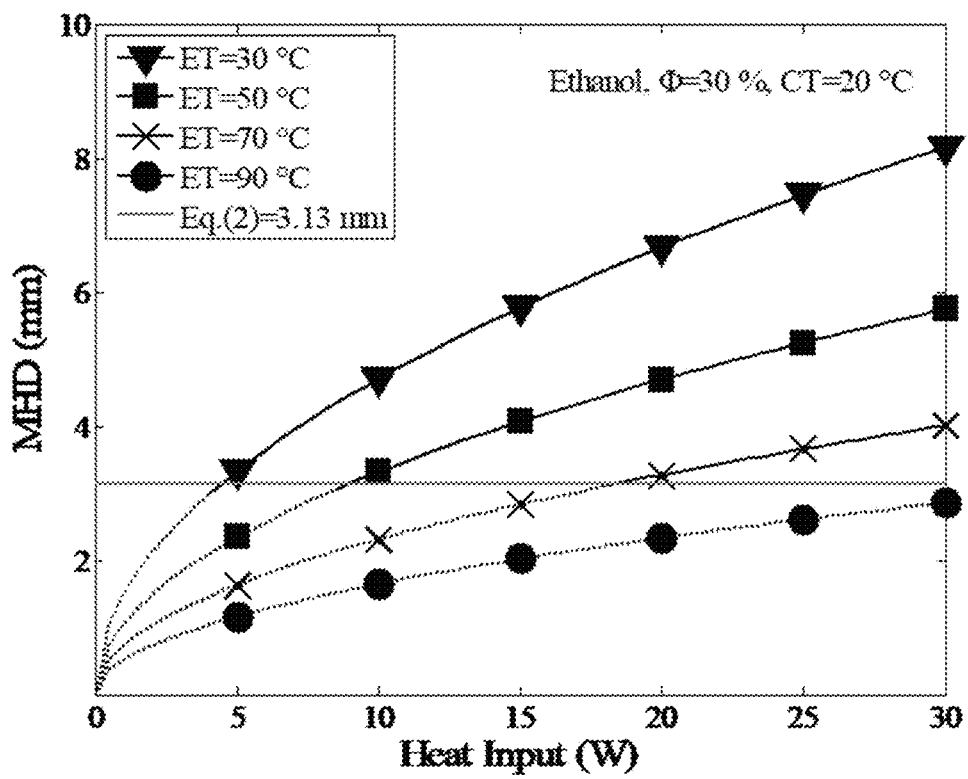
FIG. 4 is a schematic diagram of the theoretical calculation results of startup critical tube diameter of the pulsating heat pipe when the working medium is anhydrous ethanol, wherein (a) and (b) are the calculation results respectively at 20° C. and 60° C. when the filling ratio is 30%, (c) and (d) are the calculation results respectively at 20° C. and 60° C. when the filling ratio is 50%, and (e) and (f) are the calculation results respectively at 20° C. and 60° C. when the filling ratio is 70%.
Figure 4:
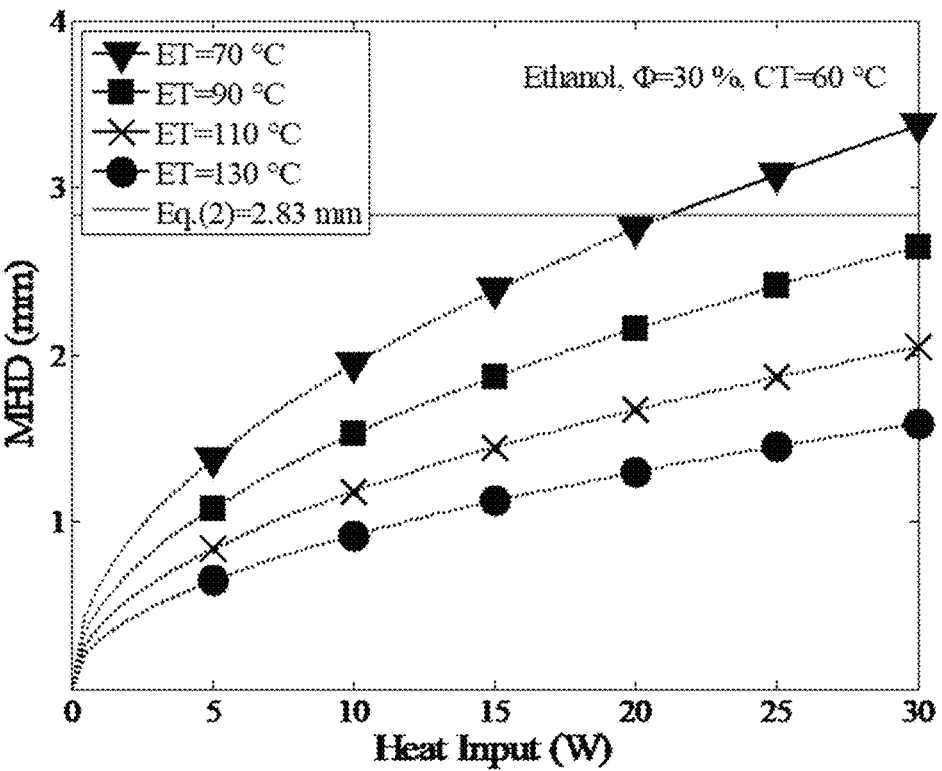
Figure 4:
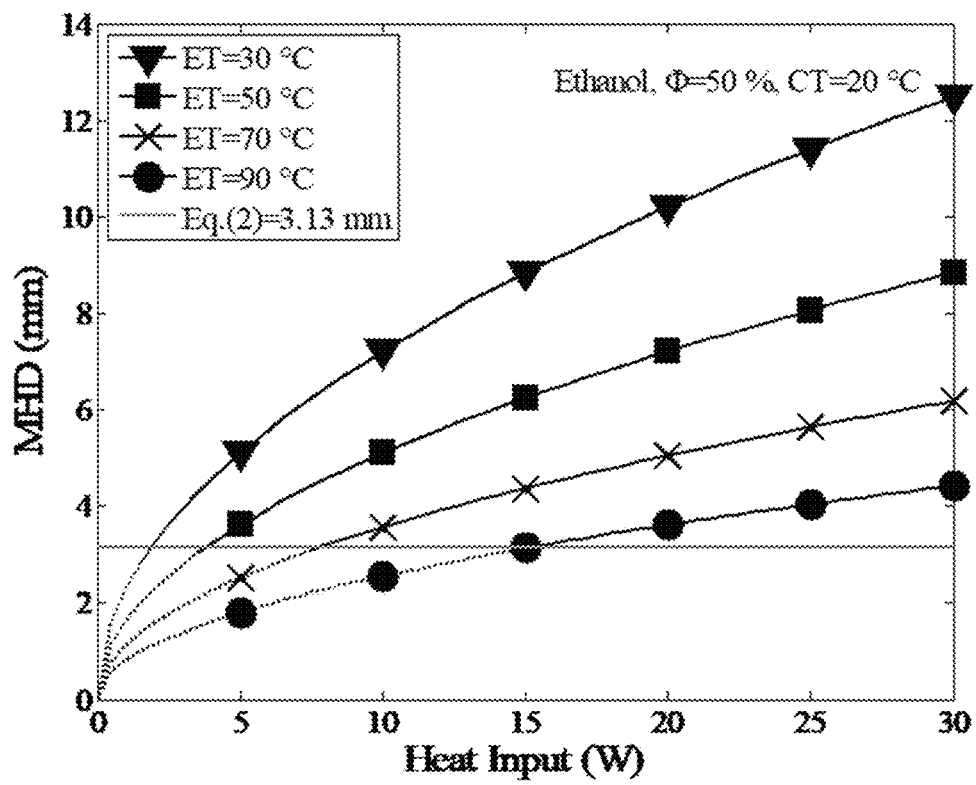
Figure 4:
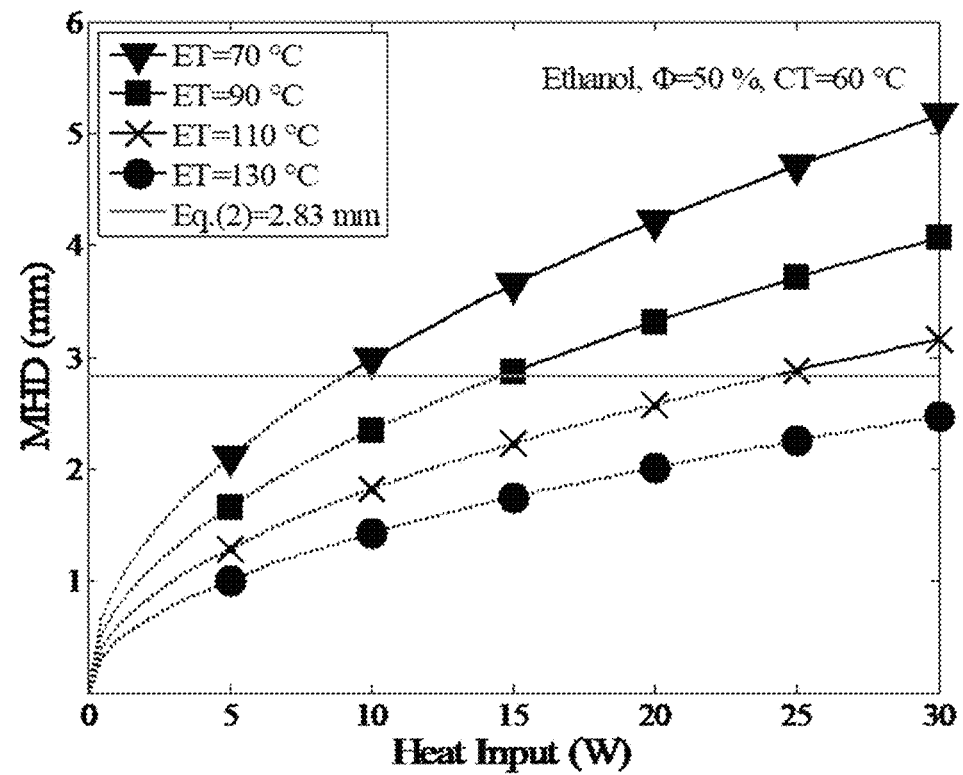
Figure 4:
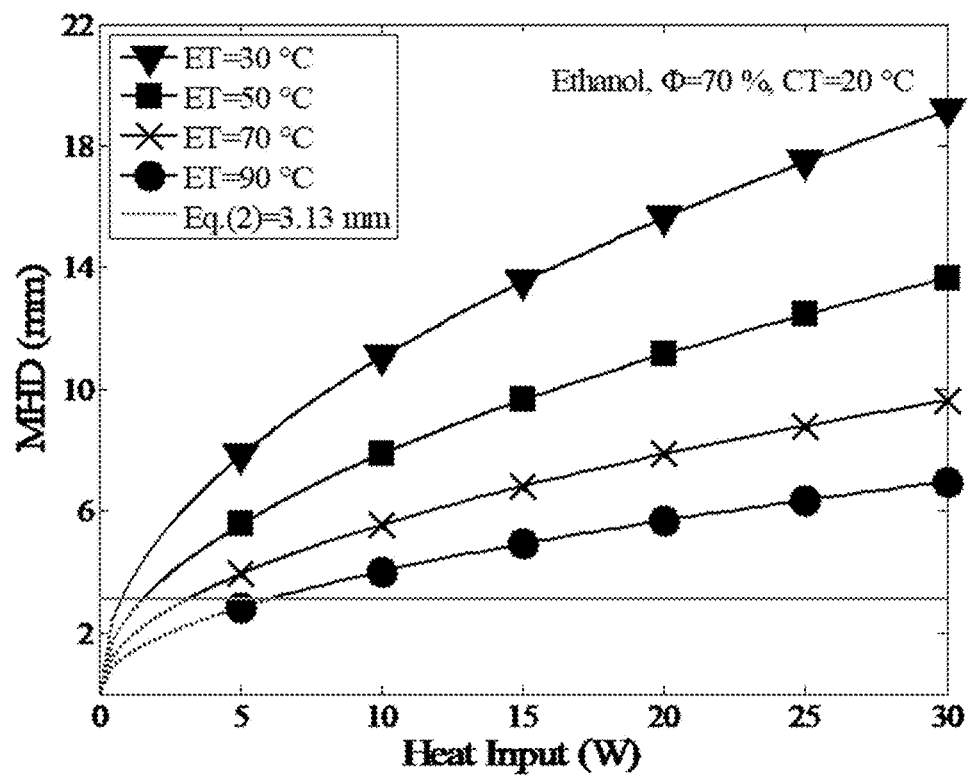
Figure 4:
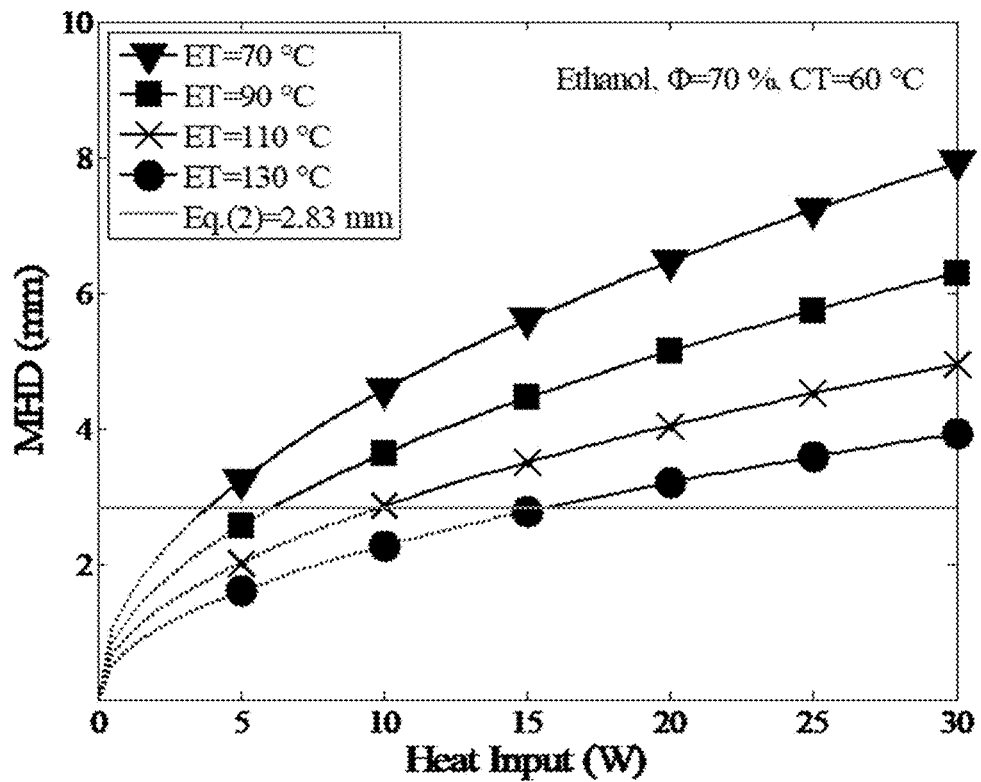

In MATLAB software, under the working condition, the parameters of working medium property, operating temperature, heating power, and filling ratio were substituted into the equation of startup critical tube diameter to obtain the theoretical calculation results of startup critical tube diameter of the pulsating heat pipe and the schematic diagram thereof, as shown in picture (a) in FIG. 4, wherein ET represents the temperature at the heat-absorbing end, and CT represents the operating temperature; and the transverse line represents the calculation results of the maximum hydraulic diameter obtained by the calculation equation of the maximum hydraulic diameter, which is only related to the operating temperature. The corresponding critical tube diameter and startup critical tube diameter under the working condition are shown in Table 1.

TABLE 1

The corresponding maximum hydraulic diameter and startup critical tube diameter under the working condition

| Working medium | Filling ratio (%) | Input power (W) | Operating temperature (° C.) | Heat-absorbing end temperature (° C.) | Maximum hydraulic diameter (mm) | Startup critical tube diameter (mm) |
|---|---|---|---|---|---|---|
| Anhydrous ethanol | 30 | 30 | 20 | 30 | 3.13 | 8.18473846 |
| | | | | 50 | 3.13 | 5.79946108 |
| | | | | 70 | 3.13 | 4.06703996 |
| | | | | 90 | 3.13 | 2.91531718 |

Embodiment 3

The working condition of this embodiment was that the input power of a single pipe was 30 W, the operating temperature was 20° C., the working medium was anhydrous ethanol, the filling ratio was 50%, and the temperature at the heat-absorbing end was respectively 30° C., 50° C., 70° C. and 90° C.

In MATLAB software, under the working condition, the parameters of working medium property, operating temperature, heating power, and filling ratio were substituted into the equation of startup critical tube diameter to obtain the theoretical calculation results of startup critical tube diameter of the pulsating heat pipe and the schematic diagram thereof, as shown in picture (c) in FIG. 4, wherein ET represents the temperature at the heat-absorbing end, and CT represents the operating temperature; and the transverse line represents the calculation results of the maximum hydraulic diameter obtained by the calculation equation of the maximum hydraulic diameter, which is only related to the operating temperature. The corresponding maximum hydraulic diameter and startup critical tube diameter under the working condition are shown in Table 2.

TABLE 2

The corresponding maximum hydraulic diameter and startup critical tube diameter under this condition

| Working medium | Filling ratio (%) | Input power (W) | Operating temperature (° C.) | Heat-absorbing end temperature (° C.) | Maximum hydraulic diameter (mm) | Startup critical tube diameter (mm) |
|---|---|---|---|---|---|---|
| Anhydrous ethanol | 50 | 30 | 20 | 30 | 3.13 | 12.5233213 |
| | | | | 50 | 3.13 | 8.90425616 |
| | | | | 70 | 3.13 | 6.26929407 |
| | | | | 90 | 3.13 | 4.51537807 |

Embodiment 4

The working condition of this embodiment was that the input power of a single pipe was 30 W, the operating temperature was 20° C., the working medium was anhydrous ethanol, the filling ratio was 70%, and the temperature at the heat-absorbing end was respectively 30° C., 50° C., 70° C. and 90° C.

In MATLAB software, under the working condition, the parameters of working medium property, operating temperature, heating power, and filling ratio were substituted into the equation of startup critical tube diameter to obtain the theoretical calculation results of startup critical tube diameter of the pulsating heat pipe and the schematic diagram thereof, as shown in picture (e) in FIG. 4, wherein ET represents the temperature at the heat-absorbing end, and CT represents the operating temperature; and the transverse line represents the calculation results of the maximum hydraulic diameter obtained by the calculation equation of the maximum hydraulic diameter, which is only related to the operating temperature. The corresponding maximum hydraulic diameter and startup critical tube diameter under the working condition are shown in Table 3.

Embodiment 5

The working condition of this embodiment was that the input power of a single pipe was 30 W, the operating temperature was 60° C., the working medium was anhydrous ethanol, the filling ratio was 30%, and the temperatures at the heat-absorbing end was respectively 70° C., 90° C., 110° C. and 130° C.

In MATLAB software, under the working condition, the parameters of working medium property, operating temperature, heating power, and filling ratio were substituted into the equation of startup critical tube diameter to obtain the theoretical calculation results of startup critical tube diameter of the pulsating heat pipe and the schematic diagram thereof, as shown in picture (b) in FIG. 4, wherein ET represents the temperature at the heat-absorbing end, and CT represents the operating temperature; and the transverse line represents the calculation results of the maximum hydraulic diameter obtained by the calculation equation of the maximum hydraulic diameter, which is only related to the operating temperature. The corresponding maximum hydraulic diameter and startup critical tube diameter under this condition are shown in Table 4.

TABLE 3

The corresponding maximum hydraulic diameter and startup critical tube diameter under the working condition

| Working medium | Filling ratio (%) | Input power (W) | Operating temperature (° C.) | Heat-absorbing end temperature (° C.) | Maximum hydraulic diameter (mm) | Startup critical tube diameter (mm) |
|---|---|---|---|---|---|---|
| Anhydrous ethanol | 70 | 30 | 20 | 30 | 3.13 | 19.2001081 |
| | | | | 50 | 3.13 | 13.760411 |
| | | | | 70 | 3.13 | 9.77739743 |
| | | | | 90 | 3.13 | 7.11840283 |

TABLE 4

The corresponding maximum hydraulic diameter and startup critical tube diameter under the working condition

| Working medium | Filling ratio (%) | Input power (W) | Operating temperature (° C.) | Heat-absorbing end temperature (° C.) | Maximum hydraulic diameter (mm) | Startup critical tube diameter (mm) |
|---|---|---|---|---|---|---|
| Anhydrous ethanol | 30 | 30 | 60 | 70 | 2.83 | 3.376928 |
| | | | | 90 | 2.83 | 2.663269 |
| | | | | 110 | 2.83 | 2.073034 |
| | | | | 130 | 2.83 | 1.620994 |

Embodiment 6

The working condition of this embodiment was that the input power of a single pipe was 30 W, the operating temperature was 60° C., the working medium was anhydrous ethanol, the filling ratio was 50%, and the temperature at the heat-absorbing end was respectively 70° C., 90° C., 110° C. and 130° C.

In MATLAB software, under the working condition, the parameters of working medium property, operating temperature, heating power, and filling ratio were substituted into the equation of startup critical tube diameter to obtain the theoretical calculation results of startup critical tube diameter of the pulsating heat pipe and the schematic diagram thereof, as shown in picture (d) in FIG. 4, wherein ET represents the temperature at the heat-absorbing end, and CT represents the operating temperature; and the transverse line represents the calculation results of the maximum hydraulic diameter obtained by the calculation equation of the maximum hydraulic diameter, which is only related to the operating temperature. The corresponding maximum hydraulic diameter and startup critical tube diameter under the working condition are shown in Table 5.

Embodiment 7

The working condition of this embodiment was that the input power of a single pipe was 30 W, the operating temperature was 60° C., the working medium was anhydrous ethanol, the filling ratio was 70%, and the temperature at the heat-absorbing end was respectively 70° C., 90° C., 110° C. and 130° C.

In MATLAB software, under the working condition, the parameters of working medium property, operating temperature, heating power, and filling ratio were substituted into the equation of startup critical tube diameter to obtain the theoretical calculation results of startup critical tube diameter of pulsating heat pipe and the schematic diagram thereof, as shown in picture (f) in FIG. 4, wherein ET represents the temperature at the heat-absorbing end, and CT represents the operating temperature; and the transverse line represents the calculation results of the maximum hydraulic diameter obtained by the calculation equation of the maximum hydraulic diameter, which is only related to the operating temperature. The corresponding maximum hydraulic diameter and startup critical tube diameter under the working condition are shown in Table 6.

TABLE 5

The corresponding maximum hydraulic diameter and startup critical tube diameter under the working condition

| Working medium | Filling ratio (%) | Input power (W) | Operating temperature (° C.) | Heat-absorbing end temperature (° C.) | Maximum hydraulic diameter (mm) | Startup critical tube diameter (mm) |
|---|---|---|---|---|---|---|
| Anhydrous ethanol | 50 | 30 | 60 | 70 | 2.83 | 5.172435 |
| | | | | 90 | 2.83 | 4.098364 |
| | | | | 110 | 2.83 | 3.208506 |
| | | | | 130 | 2.83 | 2.527283 |

TABLE 6

The corresponding maximum hydraulic diameter and startup critical tube diameter under the working condition

| Working medium | Filling ratio (%) | Input power (W) | Operating temperature (° C.) | Heat-absorbing end temperature (° C.) | Maximum hydraulic diameter (mm) | Startup critical tube diameter (mm) |
|---|---|---|---|---|---|---|
| Anhydrous ethanol | 70 | 30 | 60 | 70 | 2.83 | 7.93828 |
| | | | | 90 | 2.83 | 6.353064 |
| | | | | 110 | 2.83 | 5.034048 |
| | | | | 130 | 2.83 | 4.024905 |

Embodiment 8

The working condition of this embodiment was that the input power of a single pipe was 30 W, the operating temperature was 20° C., the working medium was deionized water, the filling ratio was 30%, and the temperature at the heat-absorbing end was respectively 30° C., 50° C., 70° C. and 90° C.

Figure 5:
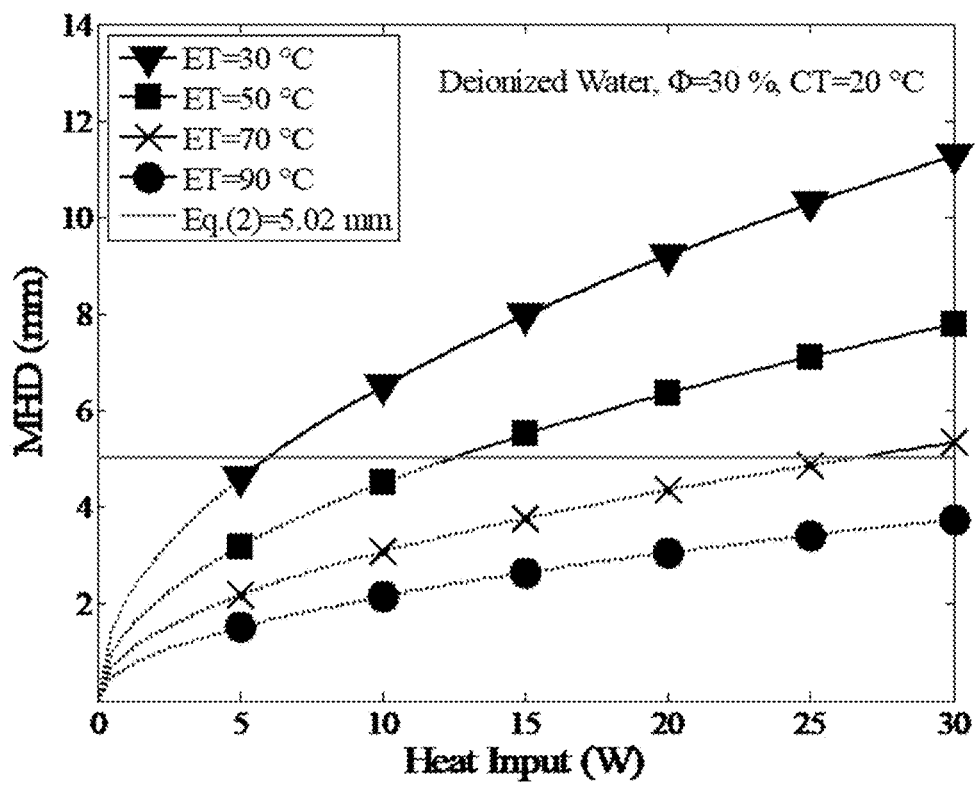
FIG. 5 is a schematic diagram of the theoretical calculation results of startup critical tube diameter of the pulsating heat pipe when the working medium is deionized water, wherein (a) and (b) are the calculation results respectively at 20° C. and 60° C. when the filling ratio is 30%, (c) and (d) are the calculation results respectively at 20° C. and 60° C. when the filling ratio is 50%, and (e) and (f) are the calculation results respectively at 20° C. and 60° C. when the filling ratio is 70%.
Figure 5:
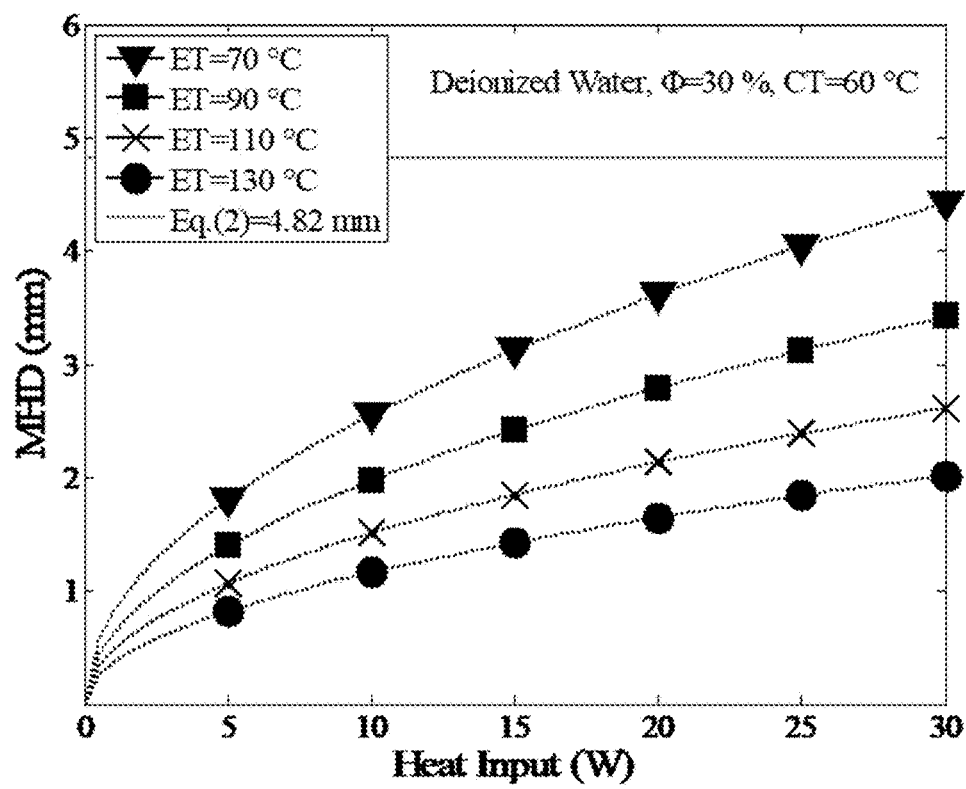
Figure 5:
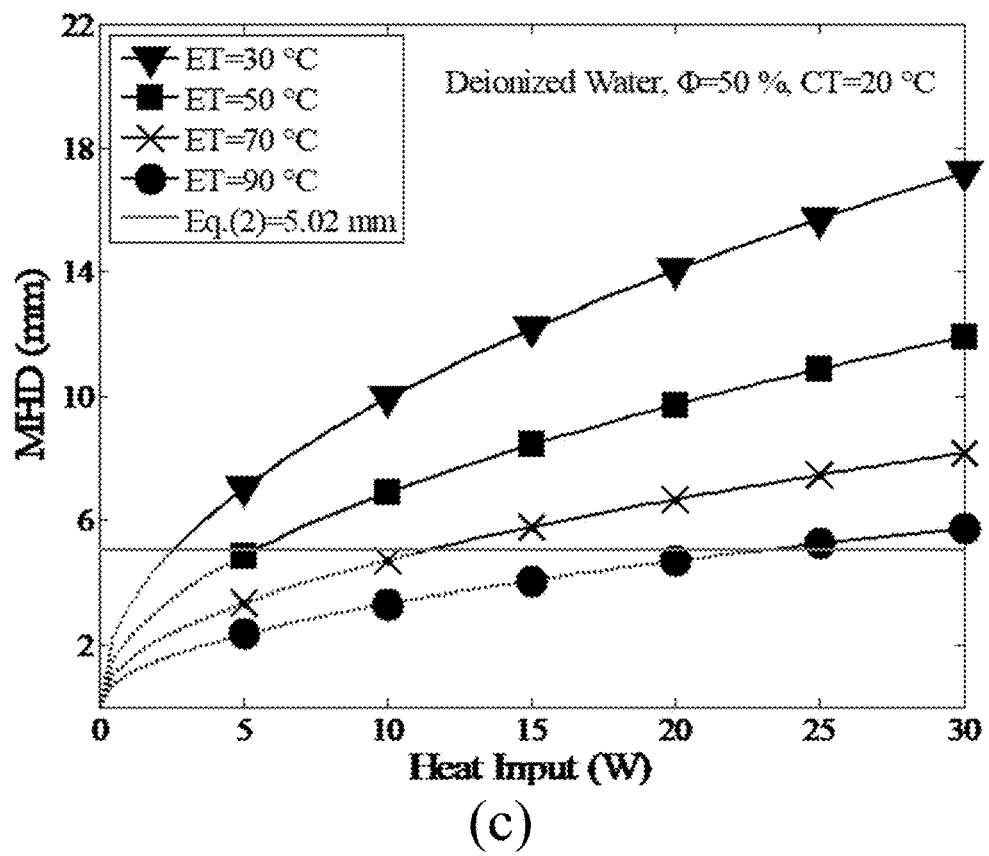
Figure 5:
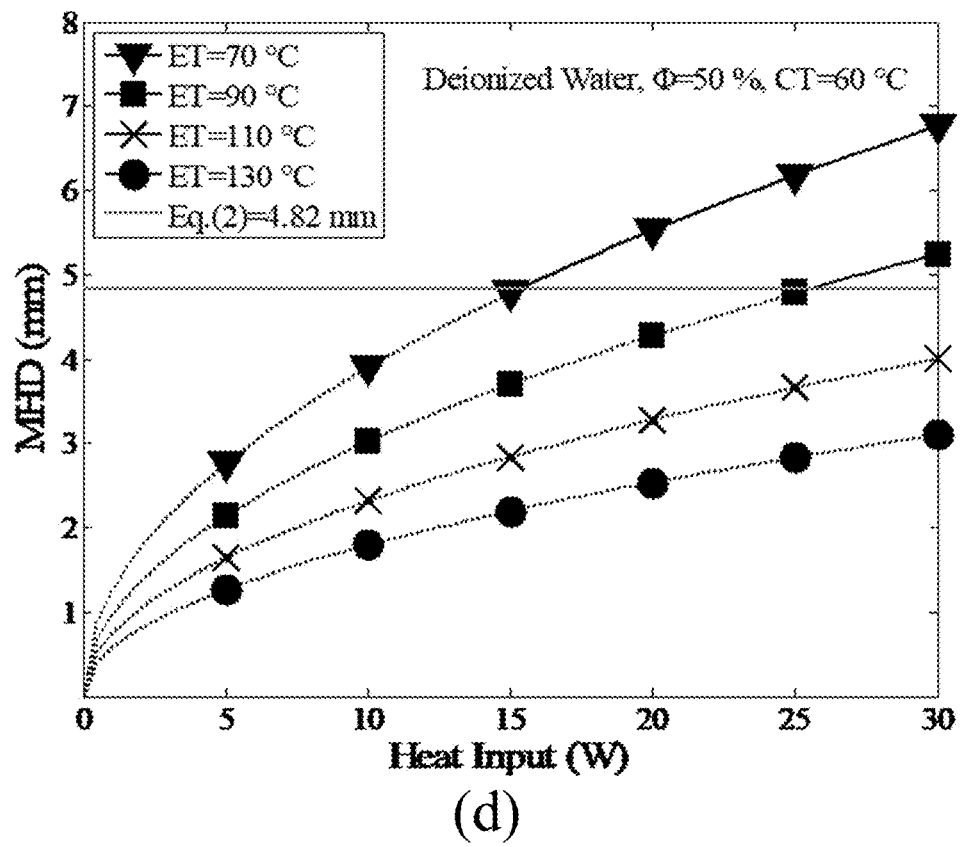
Figure 5:
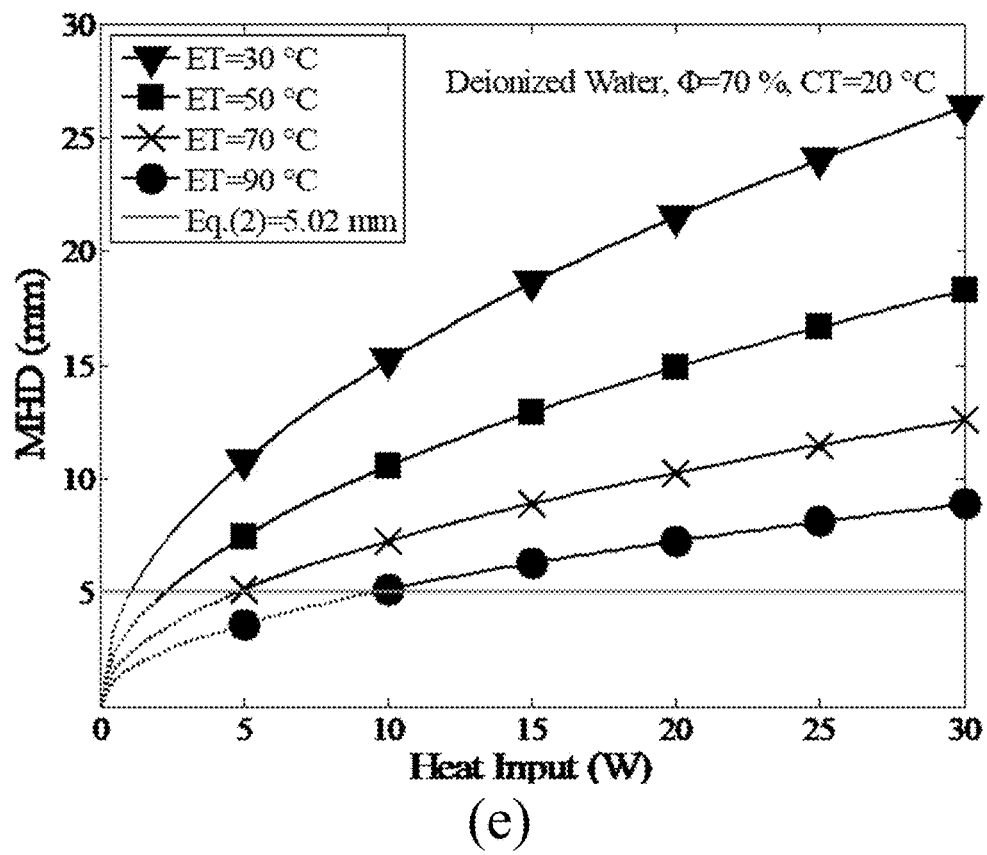
Figure 5:
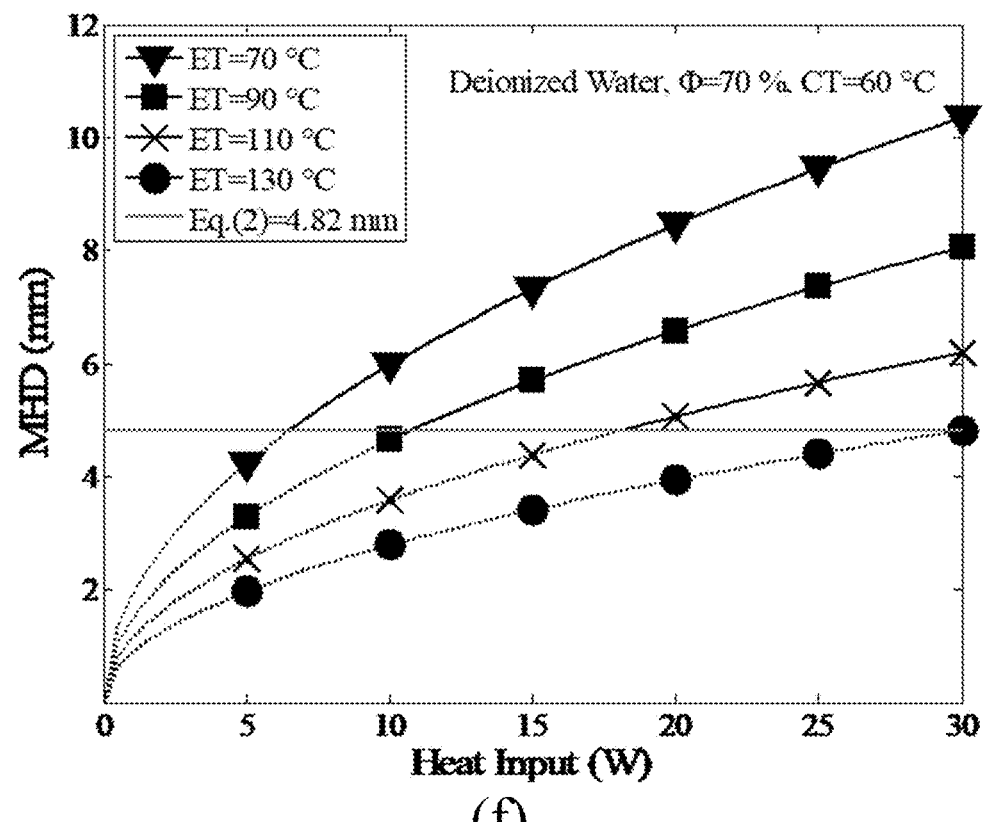

In MATLAB software, under the working condition, the parameters of working medium property, operating temperature, heating power, and filling ratio were substituted into the equation of startup critical tube diameter to obtain the theoretical calculation results of startup critical tube diameter of pulsating heat pipe and the schematic diagram thereof, as shown in picture (a) in FIG. 5, wherein ET represents the temperature at the heat-absorbing end, and CT represents the operating temperature; and the transverse line represents the calculation results of the maximum hydraulic diameter obtained by the calculation equation of the maximum hydraulic diameter, which is only related to the operating temperature. The corresponding maximum hydraulic diameter and startup critical tube diameter under the working condition are shown in Table 7.

TABLE 7

The corresponding maximum hydraulic diameter and startup critical tube diameter under the working condition

| Working medium | Filling ratio (%) | Input power (W) | Operating temperature (° C.) | Heat-absorbing end temperature (° C.) | Maximum hydraulic diameter (mm) | Startup critical tube diameter (mm) |
|---|---|---|---|---|---|---|
| Deionized water | 30 | 30 | 20 | 30 | 3.13 | 11.2786993 |
| | | | | 50 | 3.13 | 7.81365013 |
| | | | | 70 | 3.13 | 5.36450771 |
| | | | | 90 | 3.13 | 3.77741972 |

Embodiment 9

The working condition of this embodiment was that the input power of a single pipe was 30 W, the operating temperature was 20° C., the working medium was deionized water, the filling ratio was 50%, and the temperature at the heat-absorbing end was respectively 30° C., 50° C., 70° C. and 90° C.

In MATLAB software, under the working condition, the parameters of working medium property, operating temperature, heating power, and filling ratio were substituted into the equation of startup critical tube diameter to obtain the theoretical calculation results of startup critical tube diameter of the pulsating heat pipe and the schematic diagram thereof, as shown in picture (c) in FIG. 5, wherein ET represents the temperature at the absorption end, and CT represents the operating temperature; and the transverse line represents the calculation results of the maximum hydraulic diameter obtained by the calculation equation of the maximum hydraulic diameter, which is only related to the operating temperature. The corresponding maximum hydraulic diameter and startup critical tube diameter under the working condition are shown in Table 8.

TABLE 8

The corresponding maximum hydraulic diameter and startup critical tube diameter under the working condition

| Working medium | Filling ratio (%) | Input power (W) | Operating temperature (° C.) | Heat-absorbing end temperature (° C.) | Maximum hydraulic diameter (mm) | Startup critical tube diameter (mm) |
|---|---|---|---|---|---|---|
| Deionized water | 50 | 30 | 20 | 30 | 3.13 | 17.2350751 |
|  |  |  |  | 50 | 3.13 | 11.9534699 |
|  |  |  |  | 70 | 3.13 | 8.21943756 |
|  |  |  |  | 90 | 3.13 | 5.79895111 |

Embodiment 10

The working condition of this embodiment was that the input power of a single pipe was 30 W, the operating temperature was 20° C., the working medium was deionized water, the filling ratio was 70%, and the temperature at the heat-absorbing end was respectively 30° C., 50° C., 70° C. and 90° C.

In MATLAB software, under the working condition, the parameters of working medium property, operating temperature, heating power, and filling ratio were substituted into the equation of startup critical tube diameter to obtain the theoretical calculation results of startup critical tube diameter of the pulsating heat pipe and the schematic diagram thereof, as shown in picture (e) in FIG. 5, wherein ET represents the temperature at the absorption end, and CT represents the operating temperature; and the transverse line represents the calculation results of the maximum hydraulic diameter obtained by the calculation equation of the maximum hydraulic diameter, which is only related to the operating temperature. The corresponding maximum hydraulic diameter and startup critical tube diameter under the working condition are shown in Table 9.

TABLE 9

The corresponding maximum hydraulic diameter and startup critical tube diameter under the working condition

| Working medium | Filling ratio (%) | Input power (W) | Operating temperature (° C.) | Heat-absorbing end temperature (° C.) | Maximum hydraulic diameter (mm) | Startup critical tube diameter (mm) |
|---|---|---|---|---|---|---|
| Deionized water | 70 | 30 | 20 | 30 | 3.13 | 26.3496976 |
|  |  |  |  | 50 | 3.13 | 18.322403 |
|  |  |  |  | 70 | 3.13 | 12.6441629 |
|  |  |  |  | 90 | 3.13 | 8.96086689 |

Embodiment 11

The working condition of this embodiment was that the input power of a single pipe was 30 W, the operating temperature was 60° C., the working medium was deionized water, the filling ratio was 30%, and the temperature at the heat-absorbing end was respectively 70° C., 90° C., 110° C. and 130° C.

In MATLAB software, under the working condition, the parameters of working medium property, operating temperature, heating power, and filling ratio were substituted into the equation of startup critical tube diameter to obtain the theoretical calculation results of startup critical tube diameter of the pulsating heat pipe and the schematic diagram thereof, as shown in picture (b) in FIG. 5, wherein ET represents the temperature at the absorption end, and CT represents the operating temperature; and the transverse line represents the calculation results of the maximum hydraulic diameter obtained by the calculation equation of the maximum hydraulic diameter, which is only related to the operating temperature. The corresponding maximum hydraulic diameter and startup critical tube diameter under the working condition are shown in Table 10.

TABLE 10

The corresponding maximum hydraulic diameter and startup critical tube diameter under the working condition

| Working medium | Filling ratio (%) | Input power (W) | Operating temperature (° C.) | Heat-absorbing end temperature (° C.) | Maximum hydraulic diameter (mm) | Startup critical tube diameter (mm) |
|---|---|---|---|---|---|---|
| Deionized water | 30 | 30 | 60 | 70 | 2.83 | 4.430809 |
| | | | | 90 | 2.83 | 3.437193 |
| | | | | 110 | 2.83 | 2.636271 |
| | | | | 130 | 2.83 | 2.03948 |

Embodiment 12

The working condition of this embodiment was that the input power of a single pipe was 30 W, the operating temperature was 60° C., the working medium was deionized water, the filling ratio was 50%, and the temperature at the heat-absorbing end was respectively 70° C., 90° C., 110° C. and 130° C.

In MATLAB software, under the working condition, the parameters of working medium property, operating temperature, heating power, and filling ratio were substituted into the equation of startup critical tube diameter to obtain the theoretical calculation results of startup critical tube diameter of the pulsating heat pipe and the schematic diagram thereof, as shown in picture (d) in FIG. 5, wherein ET represents the temperature at the absorption end, and CT represents the operating temperature; and the transverse line represents the calculation results of the maximum hydraulic diameter obtained by the calculation equation of the maximum hydraulic diameter, which is only related to the operating temperature. The corresponding maximum hydraulic diameter and startup critical tube diameter under the working condition are shown in Table 11.

TABLE 11

The corresponding maximum hydraulic diameter and startup critical tube diameter under the working condition

| Working medium | Filling ratio (%) | Input power (W) | Operating temperature (° C.) | Heat-absorbing end temperature (° C.) | Maximum hydraulic diameter (mm) | Startup critical tube diameter (mm) |
|---|---|---|---|---|---|---|
| Deionized water | 50 | 30 | 60 | 70 | 2.83 | 6.774296 |
| | | | | 90 | 2.83 | 5.265249 |
| | | | | 110 | 2.83 | 4.047725 |
| | | | | 130 | 2.83 | 3.140018 |

Embodiment 13

The working condition of this embodiment was that the input power of a single pipe was 30 W, the operating temperature was 60° C., the working medium was deionized water, the filling ratio was 70%, and the temperature at the heat-absorbing end was respectively 70° C. 90° C., 110° C. and 130° C.

In MATLAB software, under the working condition, the parameters of working medium property, operating temperature, heating power, and filling ratio were substituted into the equation of startup critical tube diameter to obtain the theoretical calculation results of startup critical tube diameter of the pulsating heat pipe and the schematic diagram thereof, as shown in picture (f) in FIG. 5, wherein ET represents the temperature at the absorption end, and CT represents the operating temperature; and the transverse line represents the calculation results of the maximum hydraulic diameter obtained by the calculation equation of the maximum hydraulic diameter, which is only related to the operating temperature. The corresponding maximum hydraulic diameter and startup critical tube diameter under the working condition are shown in Table 12.

TABLE 12

The corresponding maximum hydraulic diameter and startup critical tube diameter under the working condition

| Working medium | Filling ratio (%) | Input power (W) | Operating temperature (° C.) | Heat-absorbing end temperature (° C.) | Maximum hydraulic diameter (mm) | Startup critical tube diameter (mm) |
|---|---|---|---|---|---|---|
| Deionized water | 70 | 30 | 60 | 70 | 2.83 | 10.36761 |
| | | | | 90 | 2.83 | 8.093519 |
| | | | | 110 | 2.83 | 6.254887 |
| | | | | 130 | 2.83 | 4.882471 |

Embodiment 14

As shown in FIG. 4, according to the calculation results of pictures (a) to (f) in FIG. 4 (i.e., Embodiment 2 to 7), it can be seen that, under the same condition, the calculated value of the pipe diameter obtained by the equation of the startup critical tube diameter in the present disclosure is higher than that of the pipe diameter obtained by the equation of the maximum hydraulic diameter of the pulsating heat pipe. By comparing the calculation results of picture (a) and (b) in FIG. 4 (i.e., Embodiments 2 and 5), or pictures (c) and (d) in FIG. 4 (i.e., Embodiments 3 and 6), or pictures (e) and (f) in FIG. 4 (i.e., Embodiments 4 and 7), it can be seen that, under the same working condition of working medium, filling ratio, and heat-absorbing end temperature, the lower the operating temperature, the larger the pipe diameter of the pulsating heat pipe. According to the calculation results of any one of pictures (a) to (f) in FIG. 4 (i.e., Embodiments 2 to 7), it can be seen that, under the same working condition of heating power, working medium, filling ratio, and operating temperature, the lower the temperature at the hot end and the lower the temperature difference between the cold and hot end, the larger the pipe diameter of the pulsating heat pipe. By comparing the calculation results of pictures (a), (c) and (e) in FIG. 4 (i.e., Embodiments 2, 3 and 4), or pictures (b), (d) and (f) in FIG. 4 (i.e., Embodiments 5, 6 and 7), it can be seen that under the same working condition of heating power, working medium, hot end temperature, and operating temperature, the higher the filling ratio, the larger the pipe diameter of the pulsating heat pipe.

As shown in FIG. 5, according to the calculation results of pictures (a) to (f) in FIG. 5 (i.e., Embodiment 8 to 13), it can be seen that, when the working medium of the pulsating heat pipe was deionized water, the change rules of the hot and cold end temperatures, filling ratio, operating temperature, and heating power was the same as that of FIG. 4 which the working medium was anhydrous ethanol. By comparing the calculation results in FIG. 5 and FIG. 4, it can be seen that under the same working conditions of cold end temperature, filling ratio, operating temperature, and heating power, the startup critical tube diameter calculated with the working medium of deionized water is larger than the startup critical tube diameter calculated with the working medium of anhydrous ethanol. Therefore, the property of the working medium is one of the important factors affecting the startup critical tube diameter of the pulsating heat pipe.

In conclusion, the pulsating heat pipe can still work when the pipe diameter exceeds the maximum hydraulic diameter, and the heat transfer performance is excellent.

Finally, it should be stated that the above embodiments are only used to illustrate the technical solutions of the present disclosure without limitation; and despite reference to the aforementioned embodiments to make a detailed description of the present disclosure, those of ordinary skilled in the art should understand that the described technical solutions in above various embodiments may be modified or the part of or all technical features may be equivalently substituted; while these modifications or substitutions do not make the essence of their corresponding technical solutions deviate from the scope of the technical solutions of the embodiments of the present disclosure.

The invention claimed is:

1. A method for determining a startup critical diameter of a pulsating heat pipe in vertical state, wherein the pulsating heat pipe comprises a plurality of single pipes connected together to form a closed loop, and wherein the pulsating heat pipe comprises a channel that contains a working medium configured to absorb heat at a heat-absorbing end and to release heat at a heat-releasing end of the pulsating heat pipe, comprising:

step 0: selecting the working medium for the pulsating heat pipe;

step 1: establishing a first equation defining a relationship between a mass of the working medium in the pulsating heat pipe and a first set of parameters prior to being heated, wherein the first set of parameters comprises an effective length of the pulsating heat pipe, a cross-sectional area of the channel, a density of the working medium at an operating temperature, and a filling ratio of the working medium in the pulsating heat pipe;

step 2: establishing a second equation defining the mass of working medium in the pulsating heat pipe when being heated to form a mixture of liquid and gaseous working medium, wherein the mass of the working medium is a sum of a mass of the gaseous working medium and a mass of the liquid working medium, wherein the mass of the gaseous working medium is a function of a second set of parameters of gaseous working medium when being heated, which comprises an average density of the gaseous working medium, a volume percentage of the gaseous working medium in the pulsating heat pipe, the effective length of the pulsating heat pipe, and the cross-sectional area of the channel, wherein the mass of the liquid working medium is a function of a third set of parameters of the liquid working medium when being heated, which comprises an average density of liquid working medium, a volume percentage of the liquid working medium in the pulsating heat pipe, the effective length of the pulsating heat pipe, and the cross-sectional area of the channel;

step 3: assuming the mass of working medium prior to being heated and the mass of working medium when being heated are the same, calculating, based on the first equation and the second equation, the volume percentage of the liquid working medium in the pulsating heat pipe when being heated; and step 4: determining a startup critical diameter of the pulsating heat pipe using parameters comprising the volume percentage of the liquid working medium in the pulsating heat pipe when being heated, a plurality of physical properties of the working medium, a temperature at the heat-absorbing end, and a temperature at the heat-releasing end, a heating power that heats the pulsating heat pipe, and the filling ratio of the working medium in the pulsating heat pipe.

2. The method according to claim 1, wherein the first equation is $$M = \Phi L A \rho_{L,0};$$

wherein, M represents the mass of the working medium in the pulsating heat pipe prior to being heated, having a unit of kg; L represents the effective length of the pulsating heat pipe, having a unit of m; A represents the cross-sectional area of the channel, having a unit of m$^2$; $\rho_{L,0}$ represents the density of the working medium at an operating temperature prior to being heated, having a unit of kg/m$^3$; and $\Phi$ represents the filling ratio of the working medium in the pulsating heat pipe, having a unit of %.

3. The method for according to claim 1, wherein the second equation is $$M = M_{G,1} + M_{L,1},$$

wherein:

$$M_{L,1} = \varphi A L \rho_{L,av},$$

$M_{G,1} = (1-\varphi) A L \rho_{G,av}$, $M_{L,1}$ represents the mass of liquid working medium in one of the plurality of single pipes when being heated, having a unit of kg, $M_{G,1}$ represents the mass of gaseous working medium in the one of the plurality of single pipe when being heated, having a unit of kg, $\rho_{L,av}$ represents the average density of the liquid working medium when being heated, having a unit of kg/m$^3$, $\rho_{G,av}$ represents the average density of the gaseous working medium when being heated, having a unit of kg/m$^3$, and $\varphi$ represents the volume percentage of the liquid working medium in the pulsating heat pipe when being heated, having a unit of %.

4. The method according to claim 1, wherein $$\varphi = \frac{\Phi \rho_{L,0} - \rho_{G,av}}{\rho_{L,av} - \rho_{G,av}};$$

wherein $\varphi$ represents the volume percentage of the liquid working medium in the pulsating heat pipe when being heated, having a unit of %.

5. The method according to claim 1, wherein the startup critical diameter of the pulsating heat pipe is D, and $$D = \left\{ \frac{4 p_g q}{u \pi h_c \left[ \frac{\Phi}{\varphi} \rho_{L,0} - \rho_{L,av} \right]} \right\}^{\frac{1}{2}},$$

$$A = \frac{1}{4} \pi D^2,$$

$$u = 1.53 \left[ \frac{g(\rho_{L,av} - \rho_{G,av}) \sigma_{av}}{\rho_{L,av}^2} \right]^{\frac{1}{4}},$$

$$q = \frac{Q}{t},$$

$$t = \frac{\varphi L}{u},$$

$$p_g = \frac{\dot{m}_G h_c t}{Q},$$

$$\dot{m}_G t = M_{G,1} = M - M_{L,1} = M - L A \varphi \rho_{L,av},$$

wherein:

u represents a terminal velocity of a rising bubble relative to the liquid, having a unit of m/s, $\varphi_{av}$ represents a surface tension of the working medium, having a unit of N/m, g is the acceleration of gravity, having the unit of N/kg, t represents a time for a bubble moving from the heat-absorbing end to the heat-releasing end without taking into account an impact of a single bubble on a height of liquid level, Q represents a heat input during time t, having a unit of J, q represents an input of heating power, having a unit of J/s, $\dot{m}_G$ represents a mass flow of gaseous working medium, having a unit of kg/s, $h_c$ represents a latent heat of vaporization of the working medium at a temperature of the heat-absorbing end, having a unit of J/kg, and $p_g$ represents a proportion of the latent heat, having a unit of %.

* * * * *